March 9, 1937.  C. W. MacMILLAN  2,073,394
APPARATUS FOR THE CONTINUOUS MEASUREMENT
AND TELEMETERING OF MECHANICAL POWER
Filed Dec. 6, 1934  4 Sheets-Sheet 1

WITNESSES
Nathaniel W. Williams
Mark D. Wight

INVENTOR
Charles W. MacMillan

March 9, 1937.  C. W. MacMILLAN  2,073,394
APPARATUS FOR THE CONTINUOUS MEASUREMENT
AND TELEMETERING OF MECHANICAL POWER
Filed Dec. 6, 1934     4 Sheets-Sheet 2

WITNESSES

INVENTOR
Charles W. MacMillan

March 9, 1937.  C. W. MacMILLAN  2,073,394
APPARATUS FOR THE CONTINUOUS MEASUREMENT
AND TELEMETERING OF MECHANICAL POWER
Filed Dec. 6, 1934   4 Sheets-Sheet 3

WITNESSES
Nathaniel D. Williams
Mark D. Wight

INVENTOR
Charles W. MacMillan

March 9, 1937.                C. W. MacMILLAN                2,073,394
         APPARATUS FOR THE CONTINUOUS MEASUREMENT
         AND TELEMETERING OF MECHANICAL POWER
                Filed Dec. 6, 1934        4 Sheets-Sheet 4
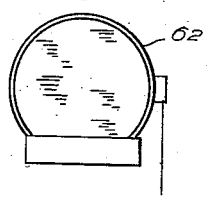
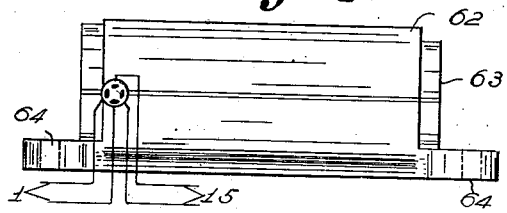
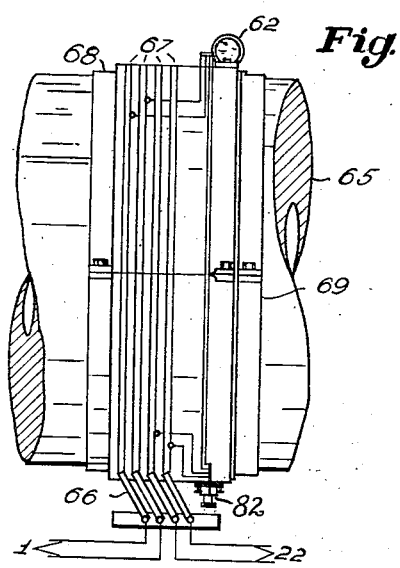
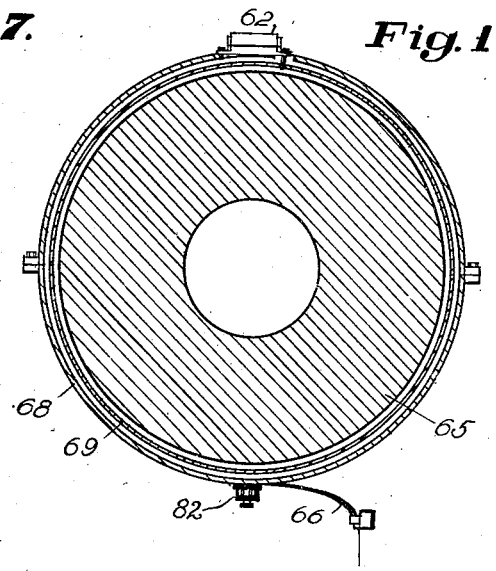
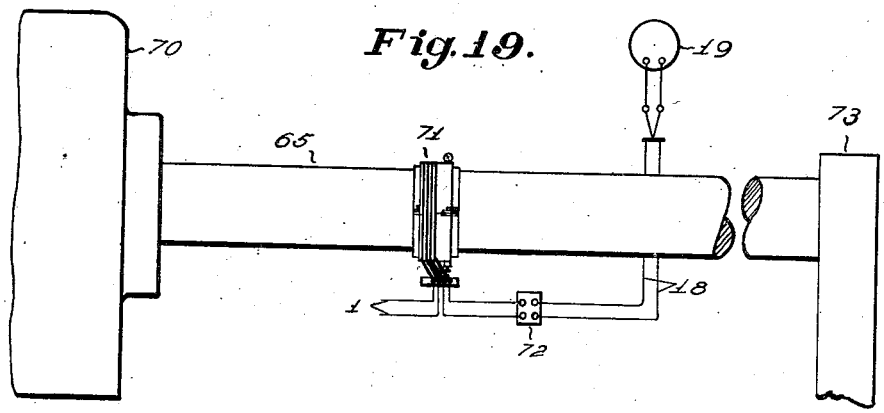
WITNESSES
INVENTOR
Charles W. MacMillan Patented Mar. 9, 1937

2,073,394

UNITED STATES PATENT OFFICE 2,073,394

APPARATUS FOR THE CONTINUOUS MEASUREMENT AND TELEMETERING OF MECHANICAL POWER

Charles W. MacMillan, Denver, Colo.

Application December 6, 1934, Serial No. 756,225

6 Claims. (Cl. 265—25)

This invention relates to the measurement and telemetering of mechanical power by the application of certain mathematical principles to a combination of mutually functioning electrical and mechanical units. These units, being responsive to certain quantities to be measured, interact to produce a properly proportioned result. The measurement of power is made perceptible by electric meter indications which are quantitatively responsive to the result.

Apparatus for obtaining results of this general nature is described in United States Patent Number 1,685,964, Smith et al.

The first object of my invention is to provide an accurate and compact means for measuring and telemetering variable mechanical power. The means herein instituted to accomplish this object involve compact mechanical and electrical units. To attain this object the movements of the mechanical parts are made functions of quantities which are proportional to force and time, or torque and speed. The measurement of these quantities is essential to the measurement of power, and for this purpose the apparatus of my invention is of such design that these elements act as factors of a mathematical product and multiply each other. To this end my invention utilizes the movement of the mechanical parts in order that electrical quantities may be controlled and metered in proportion to the power which is being measured.

The present engineering means of determining output power in connection with shafting of large cross section involves separate and individual measurements of torsion deflection and rotative speed combined with subsequent calculation or reference to charts. These inconveniences are augmented by the disadvantage of obtaining but a single, momentary measurement of the output power. It will be obvious that my invention which automatically measures and continuously indicates the output power is a substantial improvement in this art. The apparatus of my invention possesses the additional advantage of utilizing only a few inches of shaft length in contrast to the various torsion meters which are conventionally used to measure the torque factor only. Thus it will be apparent that the apparatus to be disclosed in the body of this specification provides a definite and desirable operating and engineering instrument.

Another object is to provide mechanical means of measuring the rotative speed of a shaft and to cause this measurement to be converted into electrical quantities by means of a variable coupling in an electrical circuit.

Another object is to incorporate electrical amplification means in order that the measured quantities may be telemetered over a circuit of considerable length.

Another object is to provide a new and expedient means for continuous measurement of output power in connections with marine power units. The utilization of electrical measuring means readily permits the adoption of electrical telemetering means. Continuous power indications may thus be made available at one or several remote locations within a vessel.

Another object of this invention is to provide power indicating and recording means in connection with land installations such as in an electric "grid" system. By use of this apparatus the central station of control in such a system may be supplied with accurate and continuous records of the output power of subordinate units.

Another object of this invention is to provide an instrument for laboratory and factory use whereby output power may be readily measured and the performance of turbines and motors may be easily investigated.

The fundamental purpose of the following description and the accompanying drawings is to set forth a definite principle on which the apparatus is to operate. In this respect, representative, alternative arrangements of apparatus are described and illustrated as a means of indicating the contemplated variations which rightfully fall within the scope of this invention.

A brief, preliminary description of the apparatus with reference to the figures in the drawings is as follows.

Figure 6:
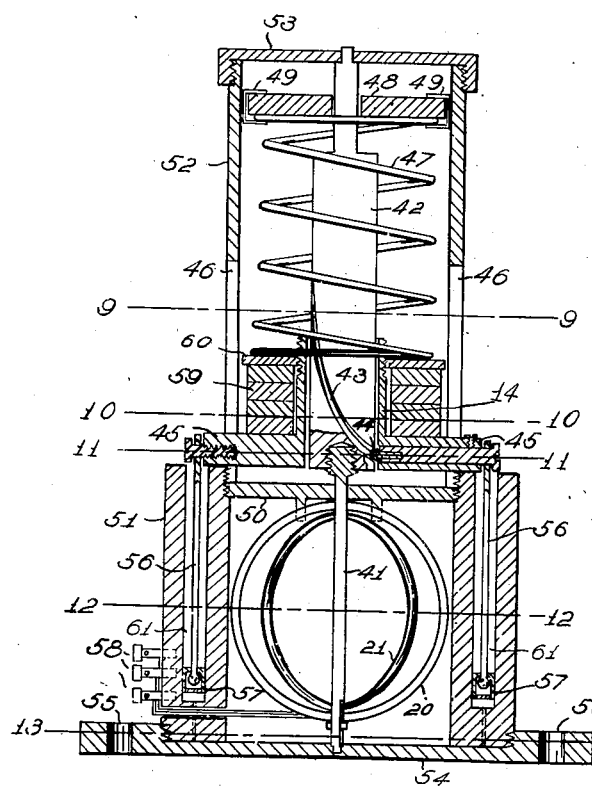
Figure 7:
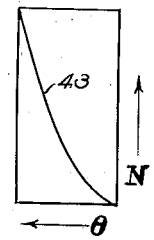
Figure 8:
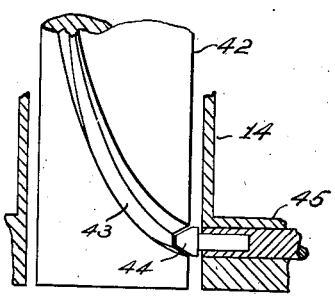
Figure 9:
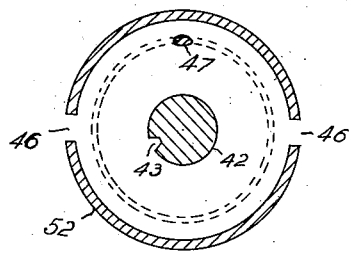
Figure 10:
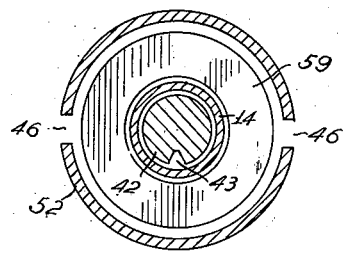
Figure 11:
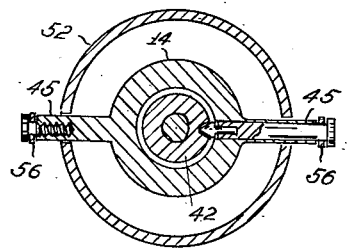
Figure 12:
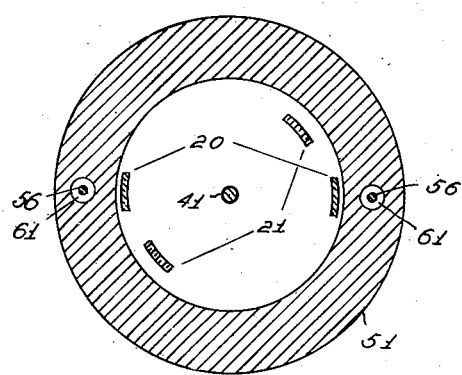
Figure 13:
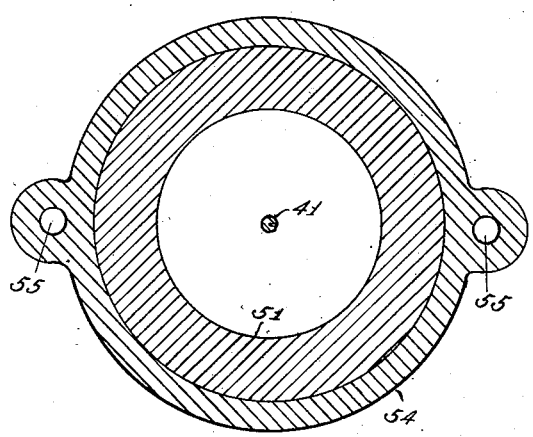
Figure 14:
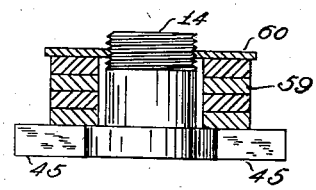

Figures 6, 7, and 8 illustrate a speed-controlled device. This device is to be attached to the shaft which is transmitting power, and is to operate after the fashion of a centrifugal, spring loaded governor to vary a reactance or resistance which is connected in the electric circuit. Figures 9 to 13 inclusive are horizontal sections illustrating the construction of the device as shown in Figure 6. A detail of the device showing the centrifugal weights is illustrated in Figure 14.

Figures 15 and 16 illustrate a form of conventional magnetic strain gauge which is applicable to the measurement of strain, or torque, and is an essential part of the combinations which may be employed in the alternating current arrangement of this apparatus.

Figure 17 illustrates the apparatus involving a strain gauge and the speed-controlled device as assembled on a power shaft. Figure 18 is a cross section of the shaft showing a circumferential view of the assembly.

Figure 19 illustrates the general appearance of the apparatus as applied to a power shaft.

It is desired that all of the figures of the drawings be regarded as descriptive rather than restrictive, and that any alterations or substitutions may be made without departing from the principle of the invention which is described in detail as follows.

Figure 1:
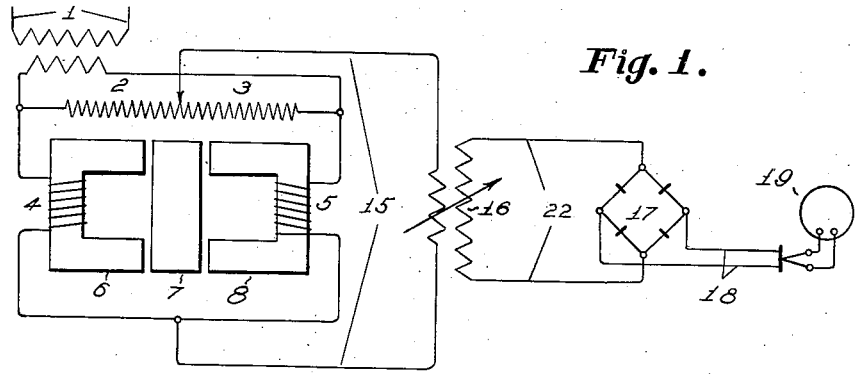
Figure 1 illustrates the general circuit of the apparatus as adapted to alternating current.

In Figure 1, numerals 6 and 8 represent laminated, U-shaped iron cores on which coils 4 and 5 are wound. These coils together with resistances 2 and 3 form the four arms of a Wheatstone bridge upon which an alternating potential is impressed from a source indicated by 1. Between cores 6 and 8 an armature piece 7 is movably located. This portion of the figure, consisting of the bridge circuit, magnetic cores, and armature piece, composes the circuit of a conventional magnetic strain gauge. In operation the strain gauge is mounted so as to cause a direct movement of armature 7 toward one of the cores 6 or 8 in response to the strain or deflection being measured. This causes the reluctance of the magnetic circuit to be increased in one core and decreased in the other. In consequence the impedances of the two coils are changed and the bridge is thrown out of balance. Current will then flow in conductors 15, and the value of this current is proportional to the voltage impressed upon the bridge circuit from circuit 1 as well as being proportional to the strain in the member to which the gauge is attached.

If the impressed voltage from circuit 1 is made constant in value, the values of voltage and current in conductors 15 will then vary as a direct function of the strain alone. A copper oxide disc rectifying unit, indicated by 17, is connected in a telemeter circuit 18 leading to a meter 19. This rectifier and meter circuit are coupled to the strain gauge bridge circuit by means of a variable coupling, one form of which may be a variable transformer coupling as indicated by 16.

In operation the apparatus is mounted on a power shaft so as to cause the current in circuit 15 to be proportional to the torsional strain in the shaft. Since the strain or torsional deflection of the shaft is in direct proportion to the torque transmitted by the shaft, the current value in circuit 15 will also be directly proportional to this torque. If, now, the transformer coupling 16 is varied as a function of the rotational speed of the shaft, a resultant current which is proportional to both torque and speed will flow in circuit 22. This current is then proportional to the power being transmitted by the shaft, and by suitable calibration the meter 19 will directly indicate this power in any chosen units. Rectification by means of 17 is desirable in order to employ a direct current meter which is generally better adapted to these indications because of its linear scale and sensitivity.

Figure 2:
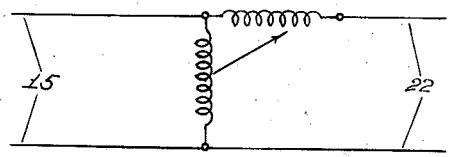
Figure 2 is a detail of a speed-varied coupling in the alternating current circuit and is illustrated as a means for explaining the principle of this feature of this invention.

For a better understanding of the interaction of the variably coupled circuits a form of variable coupling is illustrated as a detail in Figure 2. Here the two coils represent a variable autotransformer, or in effect, an induction regulator. If the two coils are identical and we represent the potential 15 by $E_1$ and the potential 22 by $E_2$, it is evident that $E_2$ may be varied from $E_1$ to $E_1 \pm E_1$, or from 0 to $2E_1$. This is then the voltage range within which the measuring units of the apparatus operate. The relative positioning of the two coils is controlled in accordance with variations in the shaft speed. Thus the value of $E_2$ depends on the speed and the value of current metered through circuit 22 is a function of the speed. Since, however, the value of $E_1$ is directly proportional to the torque, and since $E_2 = KE_1$, where $K$ is a factor proportional to the speed, the value of $E_2$ is proportional to the torque multiplied by the speed. It is readily evident that the current which flows in circuit 22 is then proportioned in value to the power being transmitted by the shaft.

Figure 3:
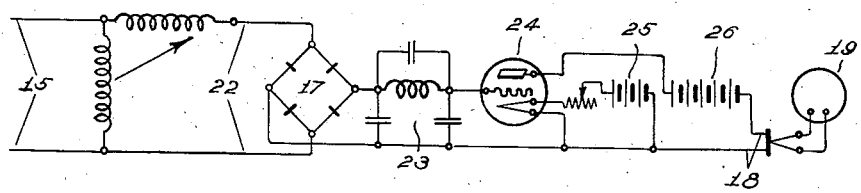
Figure 3 illustrates a detail of the alternating current circuit employing the coupling of Figure 2 in connection with a rectifying-amplifying unit and meter circuit.

This illustrated form of the apparatus as shown in Figure 1 may be adapted to a telemetering circuit of practical length by use of the circuit detail shown in Figure 3. In this circuit conductors 22 are connected to an amplifying circuit through rectifier 17. A vacuum tube 24 acts as an amplifier and is supplied by direct current sources 25 and 26. A filter which is conducive to smooth tube operation is indicated by 23.

Figure 4:
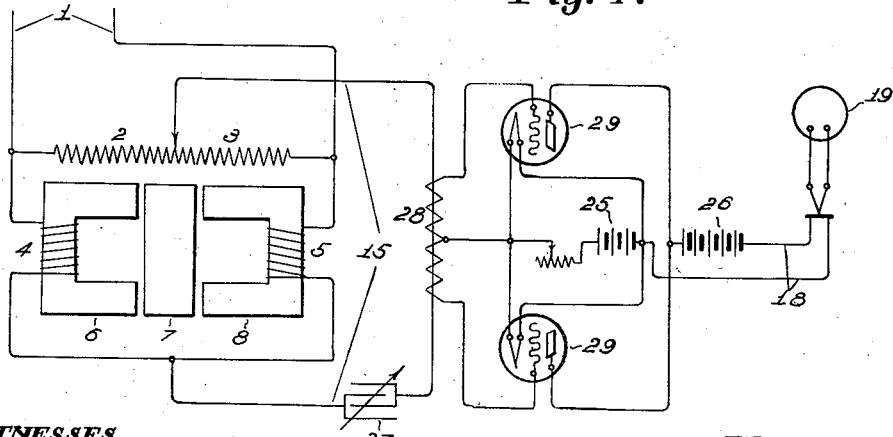
Figure 4 illustrates an example of an alternative method of employing a speed-varied reactor as well as a different coupling and amplifying arrangement.

A different form of circuit for producing the same functions is illustrated in Figure 4 as an example of the possible modifications within the principle of my invention. Here, connected in circuit 15, is a variable condenser which is varied as a function of the shaft speed. The resultant current in circuit 15 then becomes proportional to the product of the torque and speed. In this case full wave amplifying means are adopted by use of a transformer 28 and tubes 29 which are supplied by direct current sources 25 and 26. Direct, amplified current which is proportional to the power will then flow in telemetering circuit 18.

In the foregoing description I have explained the circuit diagrams and their electrical properties only in connection with alternating current. The use of a uni-directional, interrupted or pulsating current may be substituted and such a substitution is definitely contemplated. This alternative is considered reservable and being within the scope of my invention.

Figure 5:
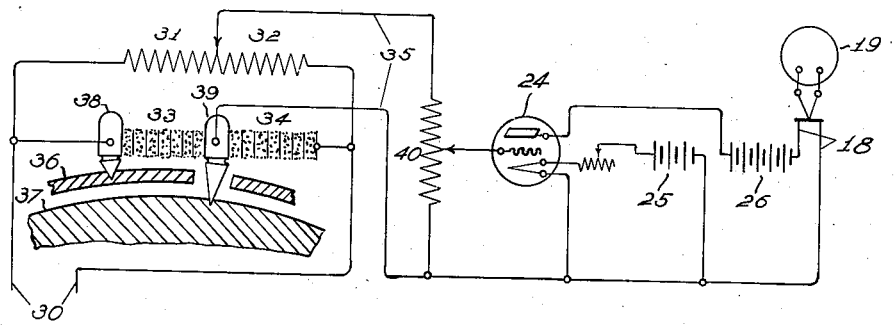
Figure 5 illustrates a general circuit employing direct current throughout for producing the result sought, and operating on the principle of this invention.

The principle involved in my invention as described in its application to alternating current is readily adapted to use of direct current. A form of direct current circuit is illustrated as an example in Figure 5 in which 33 and 34 denote carbon pile resistances which, together with resistances 31 and 32, form four arms of a Wheatstone bridge. This bridge circuit is connected to direct current leads 30 and is contained in and comprises the electrical part of a direct current strain gauge. A sectioned portion of a power shaft is indicated by 37 and a section of a short, surrounding sleeve, one end of which is made rigid to the shaft, is denoted by 36. Pieces 38 and 39 rigidly contact sleeve 36 and shaft 37. Any relative, circumferential movement of the sleeve and shaft is caused by a torsional deflection of the same magnitude. This motion is communicated to the carbon pile resistances through pieces 38 and 39 with the result that the resistances of 33 and 34 are changed in proportion to their mechanical compression. Current of a value in proportion to the torque will then flow in circuit 35. A variable resistance 40 is varied as a function of the shaft speed so as to cause a potential which is proportional to the power to be impressed upon the grid of the amplifying tube 24.

A salient feature of my invention is a practical means of providing a mechanical relation between a variable impedance, resistance, or circuit coupling and the angular velocity of a shaft. This means is illustrated in Figure 6 which is a vertical cross section of my device designed to automatically vary an impedance, resistance, or circuit coupling in direct response to variations in shaft speed.

For an understanding of the operation of this device it may be noted that a cylindrical piece 42 is attached to a long pin 41 which carries a movable coil 21 within a fixed coil 20. Removable, annular weights 59 are carried on a hollow, cylindrical piece 14 which is flanged at the bottom and provided with arms 45 extending through slots 46 in the casing 52. This hollow, cylindrical piece encases the cylinder 42 along which it is easily movable in a longitudinal direction. Figure 14 illustrates piece 14 in detail. At the inner extremity of one of the arms 45 a conical shaped cam roller is carried in such a position as to fit a cylindrical cam groove 43 cut in cylinder 42 as illustrated in Figure 8. A spring 47 is secured at one end to a threaded annular piece 60 which retains weights 59 in a compact unit. At the other end of spring 47 annular weight 48 is secured by clips 49.

Dash pot wells 61 are bored in casing 51 and rods 56 connected to arms 45 and pistons 57 operate therein. A threaded disc having a slotted cup flanged on one side is held on the inner side of casing 51 and provides support for the fixed coil 20. Binding posts 58 having conductors leading to coils 20 and 21 are mounted in an insulated manner on casing 51. The casings 51 and 52 as well as the cap 53 and base 54 are provided with threads as illustrated. The unit may thus be easily assembled.

The base 54 is provided with holes 55 for securing the device to the shaft. It will then rotate with the shaft, and in a plane perpendicular to the shaft axis. Thus, in operation, the weights 48 and 59 will move radially outward from the shaft under the action of centrifugal force. Since the roller 44 is carried outward with weights 59, its contact with cam groove 43 causes cylinder and coil 21 to rotate about the common axis along which the weights move. The linear, radial distance moved by weights 59 is in proportion to the square of the shaft speed, and to provide a linear relation between the speed and coil angle the cam groove 43 is cut parabolic in profile. The developed groove is illustrated in Figure 7 in which N represents the radial displacement of the weights and $\theta$ represents the angular displacement of the coil.

To provide a satisfactory range of equilibrium speeds in a centrifugal governing device of this type it may be desirable to provide for an initial negative spring tension. Weight 48 is provided for this reason and moves under the action of centrifugal force to place the spring initially under a negative tension. As weight 48 contacts the cap 53 the spring tension passes through zero and becomes positive as weights 59 move outward. The dashpots provide for smooth operation by their damping action.

It will be apparent that the weights are easily removable in part or in whole, and the spring is likewise easily removable. These parts may thus be readily replaced if it is desired to operate the device on a shaft of different diameter or within a different range of speeds.

The simple, circular construction of the device is illustrated by sections 9 to 13 in Figures 9 to 13.

From the foregoing description of this speed-controlled unit it will be apparent that an impedance, resistance, or circuit coupling of any nature may be varied as a function of the speed by a proper installation of the respective unit in a manner similar to the arrangement of the coils 20 and 21 which are illustrative of an example of such an installation.

For a better understanding of the general external appearance of the strain gauge reference may be made to Figures 15 and 16. These figures illustrate the compact form of a conventional design in which 62 and 63 represent cylinders which, being relatively movable, cause the contained bridge circuit to be varied in accordance with the strain as heretofore explained. This unit is provided with means for rigid installation as denoted by bored extensions 64. Alterations in the illustrated shape of the gauge and in the arrangement of its parts are contemplated as desirable for particular installations of the apparatus of my invention.

The assembled apparatus is schematically illustrated in Figures 17, 18, and 19. Strain gauge 62 is mounted on and near the ends of concentric sleeves 68 and 69. One end of sleeve 68 is fastened rigidly to the power shaft 65, and carries four slip rings 67. One end of short sleeve 69 is also attached rigidly to the shaft while its free end extends within the free end of sleeve 68. By securing the strain gauge to both sleeves it is evident that the torsional deflection of the shaft between the fixed sleeve ends will be communicated to the strain gauge.

The assembly as illustrated in Figures 17 to 19 includes the use of the centrifugal speed device 82 mounted as indicated. Brushes 66 connect circuits 1 and 22 with the circuits contained in the parts which are mounted upon the shaft. The circuits as illustrated in Figures 17 to 19, while being designated by the reference numerals of the alternating current circuits, are equally adapted to a direct current circuit and it is intended that this substitution may be made. Figure 19 illustrates the general application of the apparatus to a shaft 65 transmitting power between reduction gears 70 and a load 73.

The approximate relative proportions of a marine type shaft 65 and the concentric sleeves 71 may be obtained from Figure 19. The telemetering circuit 18 may be of practical and appreciable length by suitable design of the rectifying and amplifying unit 72.

It is to be appreciated that in carrying out the principle of my invention various types of conventional strain gauges may be used. In the appended claims no claim is made for a strain gauge as such, but only in combination with apparatus of this class is it desired to be reservable.

In concluding the description of my invention I wish to emphasize the distinct features which I believe are novel and patentable. First, I emphasize the principle involved in employing a conventional electric strain gauge and providing modification of the current or potential, as a function of the speed, in a circuit with this gauge.

The second feature I wish to point out is the employment of a telemetering circuit in combination with the strain gauge circuit to the end that current in proportion to the shaft power will be conducted to a remote meter.

A third feature to be emphasized consists of a particular means of causing current variations to be functional of varying speed, and includes the device designed for this purpose.

A fourth feature which is comprehensive of my invention is the combination of a strain gauge, an electric circuit, flow of current in proportion to the speed, and a telemetering circuit.

The precise features and elements of apparatus which I believe to be novel and which I desire to secure as Letters Patent of the United States are designated in the following claims.

I claim:—

1. In combination with a power shaft, an electric strain gauge; means operated by torsion of said power shaft to operate said strain gauge; a variable resistor connected in circuit with said strain gauge; means operated by the speed of said power shaft to operate said variable resistor and comprising a cam member, a weighted piece slidably mounted in proximity to said cam member, a spring retaining said weighted piece, a follower being attached to said weighted piece, said follower being responsive to centrifugal force of said weighted piece, means connected to said cam member for operating said variable resistor to the end that electric quantities of said circuit are proportional to both torsion and speed of said shaft.

2. In combination with a power shaft, an alternating current circuit; an alternating current magnetic strain gauge; said gauge being connected in said circuit; means operated by torsion of said shaft to operate said gauge; a telemeter circuit comprising vacuum tube amplifying means and indicating means; a variable coupling by means of which said telemeter circuit is variably coupled to said gauge; a device for varying said coupling as a function of the rotative speed of said shaft; said device being mountable on said shaft and comprising a cam member, a weighted piece slidably mounted in proximity to said cam; a spring retaining said weighted piece; a follower being attached to said weighted piece; said follower being the means of actuating said cam; means connected to said cam for varying the electrical quantities in said coupling in accordance with the movement of said weighted piece against said spring; said movement being due to centrifugal force; the combination and its operation for the purpose set forth.

3. In combination with a power shaft, a direct current circuit; an electric strain gauge; said gauge being connected in said circuit; means operated by torsion of said shaft to operate said gauge; a telemeter circuit comprising vacuum tube amplifying means and indicating means; a variable resistance by means of which said telemeter circuit is variably coupled to said gauge; a device for varying said coupling as a function of the rotative speed of said shaft; said device being mountable on said shaft and comprising a cam member, a weighted piece slidably mounted in proximity to said cam; a spring retaining said weighted piece; a follower being attached to said weighted piece; said follower being the means of actuating said cam; means connected to said cam for varying the electrical quantities in said coupling in accordance with the movement due to centrifugal force of said weighted piece against said spring; the combination and its operation for the purpose set forth.

4. An apparatus for the continuous measurement and telemetering of mechanical power comprising; a Wheatstone bridge circuit mounted on a rotating shaft; an electrical circuit of substantially constant voltage; brush and slip ring means for conducting the current of said last circuit to said Wheatstone bridge circuit; means for varying the electrical balance of said bridge circuit by a torsional deflection of said shaft; a variable coupling in circuit with said bridge circuit; speed responsive means mounted on said shaft and actuated by centrifugal force; said speed responsive means being adapted to vary the coupling; said centrifugal force being in proportion to the square of the angular velocity of said shaft; a telemeter circuit; brush and slip ring means for conducting the current from said coupling to said telemeter circuit; vacuum tube amplifying means in said telemeter circuit; an indicating meter in said circuit for sensibly indicating the mechanical power transmitted by said shaft.

5. An apparatus for the continuous measurement and telemetering of mechanical power comprising; coils wound on cores of magnetic material mounted on a rotating shaft; an electrical circuit conducting a uni-directional, pulsating current; means of conducting said current to said coils; said cores being separated by an air gap; means of altering the maxwell value of the magnetic circuits of said cores by alteration of said air gap; said alteration being controlled by, and in proportion to, a torsional deflection of said shaft; a variable coupling in circuit with said coils; speed responsive means mounted on said shaft and actuated by centrifugal force, said speed responsive means being adapted to vary the coupling; said centrifugal force being in proportion to the square of the angular velocity of said shaft; a telemeter circuit; means for conducting current from said coupling to said telemeter circuit; amplifying means in said telemeter circuit; an indicating meter in said circuit for sensibly indicating the mechanical power transmitted by said shaft.

6. A governing mechanism comprising a cylinder having a cam groove cut therein; the plane development of said groove being parabolic in shape; a sleeve fitting concentrically with said cylinder; a portion of said sleeve being threaded at one end and flanged at the other end; a plurality of annular weights fitting concentrically with and upon said sleeve; a threaded annular piece mating with threads of said sleeve; said piece retaining said weights in a compact unit; a roller mounted within said sleeve and fitting in said cam groove; a helical spring being attached at one end to said threaded annular piece, an attached annular weight carried at the other end of said spring; a cylindrical housing having dashpot wells; extensions attached to said sleeve and extending outwardly through openings in said cylindrical housing; connecting rods and pistons being attached to said extensions and extending into said dash pot wells; a supporting pin connected rigidly to said cam cylinder and being rotatable with said cam cylinder; a removable base and cap fitted to said cylindrical housing and providing bearing supports for said pin and cam cylinder; means for variably supporting a variable electrical unit on said pin; the device substantially as set forth.

CHARLES W. MacMILLAN.